(12) United States Patent
Locher et al.

(10) Patent No.: US 10,791,870 B2
(45) Date of Patent: Oct. 6, 2020

(54) HEATING AND FOAMING A BEVERAGE (71) Applicant: EVERSYS Holding SA, Ardon (CH)

(72) Inventors: Grégoire Locher, Daillon (CH); Stéphane Betrisey, Charrat (CH)

(73) Assignee: EVERSYS HOLDING SA, Ardon (CH)

( * ) Notice: Subject to any disclaimer, the term of this patent is extended or adjusted under 35 U.S.C. 154(b) by 241 days.

(21) Appl. No.: 15/767,165

(22) PCT Filed: Oct. 6, 2016

(86) PCT No.: PCT/EP2016/073867
§ 371 (c)(1),
(2) Date: Apr. 10, 2018

(87) PCT Pub. No.: WO2017/063936
PCT Pub. Date: Apr. 20, 2017

(65) Prior Publication Data
US 2018/0303280 A1    Oct. 25, 2018

(30) Foreign Application Priority Data

Oct. 16, 2015   (DE) .......................... 10 2015 117 650
Feb. 23, 2016   (EP) ..................................... 16156809

(51) Int. Cl.
*A47J 31/44* (2006.01)
*A47J 31/30* (2006.01)

(52) U.S. Cl.
CPC ....... *A47J 31/4489* (2013.01); *A47J 31/4485* (2013.01); *A47J 31/30* (2013.01)

(58) Field of Classification Search
CPC ..... A47J 31/4489; A47J 31/4485; A47J 31/30
See application file for complete search history.

(56) References Cited

U.S. PATENT DOCUMENTS 7,600,467 B2    10/2009  Coccia et al.
8,661,968 B2 *   3/2014  Turi .................... A47J 31/4485
                                                        426/231

(Continued)

FOREIGN PATENT DOCUMENTS

DE     102011077776 A1    12/2012
EP        1501398 A1      2/2005

(Continued)

OTHER PUBLICATIONS

International Preliminary Report on Patentability dated Apr. 17, 2018 for PCT/EP2016/073867.

(Continued)

*Primary Examiner* — Ryan J. Walters
(74) *Attorney, Agent, or Firm* — Paul D. Bianco; Gary S. Winer; Fleit Intellectual Property Law (57) ABSTRACT

A device and a method for heating and foaming a liquid, in particular a beverage such as a milk-containing beverage for example. The device comprises a steam generator, a pressurized gas source, and a pump means which is connected to the steam generator and the pressurized gas source for transporting a steam/gas mixture into the liquid. The pressurized gas source comprises a controllable switching valve in order to generate pressure pulses. The pressure pulses generated by the pressurized gas source are introduced into the pump means and mixed with the liquid in the pump means, whereby the liquid is foamed. The foam properties of the foamed liquid, such as consistency, creaminess, density, and porosity, can be influenced by the frequency, amplitude, and pulse duration of the pressure pulses.

19 Claims, 5 Drawing Sheets

(56) References Cited

U.S. PATENT DOCUMENTS 9,474,408 B2 10/2016 Dollner et al.
2013/0145936 A1 6/2013 Dollner

FOREIGN PATENT DOCUMENTS

EP 1949829 A1 7/2008
EP 2627227 A1 8/2013

OTHER PUBLICATIONS

Written Opinion dated Jan. 23, 2017 for PCT/EP2016/073867.
International Search Report dated Jan. 10, 2017 for PCT/EP2016/073867 filed Oct. 6, 2016.
Written Opinion for PCT/EP2016/073867 filed Oct. 6, 2016.

* cited by examiner

Fig. 5b

HEATING AND FOAMING A BEVERAGE

FIELD OF THE INVENTION

The present invention relates to a device for heating and foaming a liquid, in particular a beverage. The present invention also relates to a method for heating and foaming a liquid. The device and the method can be used, in particular, for heating and foaming milk, for example, for preparing hot milk-containing beverages, such as cappuccino, latte macchiato or cocoa beverages.

BACKGROUND

A device for heating and foaming a beverage product, in particular milk, is known from DE 10 2011 077 776 A1. This device comprises a steam generator, a pressurized air source with an air pipe for delivering pressurized air from the pressurized air source to the steam generator and a steam/air pipe, which is connected to the steam generator, for delivering a steam/air mixture from the steam generator into the beverage product. The air pipe and/or the steam/air pipe are (each) fitted with a shut-off element, for example, in the form of a valve. The device allows improved foaming of the beverage product since the pressurized air is fed directly from the pressurized air source into the steam generator. As a result, a heated steam/air mixture is already made available in the steam generator, thereby reducing the condensation of liquid in the steam pipe. By opening and closing the shut-off elements in the air pipe and/or the steam/air pipe, the flow of air and/or the flow of the steam/air mixture into the beverage product can be controlled and adjusted.

A similar device for heating and foaming milk, in particular for preparing cappuccino in a coffee machine, has been described in EP 1 501 398 A1. This device comprises a steam-generating hot water generator, a pump means with an open end which can be immersed in a receptacle containing milk, a steam pipe for delivering steam, which pipe is interconnected between the hot water generator and the pump means, a shut-off element, a pressurized air source, a pressurized air pipe, which is interconnected between the pressurized air source and the pump means, for delivering pressurized air into the pump means, a temperature sensor which is connected to the end of the pump means, which end can be immersed in the milk, so as to measure the temperature of the milk in the receptacle, and a control unit which is coupled to the shut-off element, to the pressurized air source and to the temperature sensor and which is programmed so as to allow the shut-off element to be opened and closed and the pressurized air source to be actuated independently of each other and according to the desired temperature and/or foaming of the milk. Thus, the milk can be heated to a required temperature and to be foamed with a predefined foam/liquid ratio. This allows the foam/liquid ratio of the foamed milk to be adjusted to a certain extent to the prevailing requirements.

Although the prior-art devices for heating and foaming beverages, in particular milk beverages, make it possible to automatically heat and foam the beverage while maintaining a predefined beverage temperature, it is possible only to a limited extent to predefine and produce a desired consistency of the foamed beverage and, in particular, a predefined foam/liquid ratio of the foam produced. To produce a desired consistency with a predefined foam/liquid ratio of the foamed beverage, predefined control programs are programmed in the control unit of the prior-art devices, which programs allow an operator to predefine a foam temperature and desired consistency by selecting one of the control programs, whereupon the device is automatically controlled in accordance with the control program selected. This ensures a fully automated operation, on the one hand; on the other hand, however, an operator is no longer able to intervene in the operating process, which becomes necessary, for example, when it is already apparent during the foaming procedure that the desired foam consistency cannot be attained. Furthermore, the operator is constrained by the pre-programmed control programs and is unable to customize the composition of the foamed liquid with respect to its temperature and foam consistency as well as other properties of the foam.

However, it is known that, in addition to the foaming temperature, the foaming properties of milk are also highly dependent on the properties of the milk used, such as the fat content, the pasteurization and preceding heat treatment (brief heat treatment, heat treatment at high or ultrahigh temperatures), the pH value, the protein content and the length of storage time, as described, for example, in the dissertation of Katja Borcherding, University of Kiel, "*Untersuchungen zur Charakterisierung der Makro- and Mikrostruktur von Milkschäumen*" ["*Studies on the Characterization of the Macro- and Microstructure of Milk Foams*"] (November 2004). It is therefore highly desirable to improve the prior-art devices for heating and foaming milk so that liquid foams and, in particular, milk foams can be produced with an individually desired and differing consistency and stability.

SUMMARY OF THE INVENTION

Taking this as the starting point, a problem to be solved by at least some embodiments of the present invention is to make available a device and a method for heating and foaming a liquid, by means of which the operator is given greater flexibility with respect to the properties of the foam generated, such as its consistency, creaminess, porosity, foam density and foam stability (drainage).

The device for heating and foaming a liquid according to the present invention comprises a steam generator, a pressurized gas source and a pump means for transporting a steam/gas mixture into the liquid, which pump means is connected to the steam generator and the pressurized gas source. To transport the steam from the steam generator into the pump means, the pump means is preferably connected via a steam pipe to the steam generator. Likewise, the pump means is preferably connected via a pressurized gas pipe to the pressurized gas source so as to charge the pump means with pressurized gas. According to the present invention, the pressurized gas source comprises a controllable switching valve which generates pressure pulses (p) that are periodically introduced via the pressurized gas pipe into the pump means. In addition to the controllable switching valve, the pressurized gas source also comprises a compressor which generates a pressurized gas (in particular pressurized air) by compressing a gas (in particular air) and feeds it via a pipe to the switching valve. The controllable switching valve is actuated in such a way that it is alternatingly, preferably periodically, opened and closed in order to generate pressure pulses.

The parameters of the pressure pulses thereby generated by the pressurized gas source, such as amplitude, pulse duration and pulse repetition rate (pulse frequency), can preferably be changed and adjusted by an operator on the device, for example, by means of switch buttons or rotary control buttons. By introducing steam and the pressure pulses of compressed gas, a steam/gas mixture is generated in the pump means and transported via the pump means into the liquid, which causes the liquid to be heated and foamed. The consistency of the thus produced foam, particularly the ratio of foam to liquid, and other parameters of the foam, such as its creaminess, porosity, foam density and the foam stability (drainage), are dependent on the selected parameters of the pressure pulses of the compressed gas and can therefore be influenced by selecting suitable pressure pulse parameters. It is therefore possible for an operator to influence the properties of the foam by changing the parameters of the pressure pulses prior to and even during the foaming procedure. Thus, for example, the pulse repetition rate (pulse frequency) of the pressure pulses that are periodically introduced into the pump means can be changed even during the foaming procedure. By changing the pulse frequency of the pressure pulses, the consistency of the foam produced in the liquid is influenced. Thus, by means of a rotary control button disposed on the device, it is possible, for example, to steplessly adjust the pulse frequency between a minimum value and a maximum value and thereby to determine the consistency of the foam produced within the predefined range between fine and coarse. Thus, by means of the device according to the present invention and the method according to the present invention, it is possible to produce a foam of any consistency, while allowing the foam consistency to be changed (to a certain extent) even in the course of the foaming process.

According to an advantageous embodiment example, to generate the pressure pulses, the pressurized gas source comprises a compressor, for example, a reciprocating piston compressor, and a switching valve in the form of a solenoid valve. The solenoid valve is disposed in the pressurized gas source downstream of the compressor. The compressor continuously generates compressed gas (pressurized gas) and uses this pressurized gas to apply pressure to the pressurized gas pipe. To generate the pressure pulses, the solenoid valve is alternatingly, and preferably periodically, opened and closed, so that pressure pulses are periodically fed via the pressurized gas pipe to the pump means. To this end, the controllable solenoid valve is preferably actuated by a control unit. More specifically, to periodically open and close the solenoid valve at a predefined pulse repetition rate (pulse frequency), the control unit actuates the solenoid valve by pulse width modulation. It is also possible to specify different opening and closing times for the solenoid valve. The predefined opening or closing times for the solenoid valve define the pulse duration of the pressure pulses. The amplitude of the pressure pulses fed into the pump means results from the (predefined and preferably adjustable) pressure, which the compressor continuously generates in the pressurized gas source, and from the drop in pressure along the flow path up to the point at which the pressurized gas pipe is connected to the pump means.

The switching valve (solenoid valve) can be arranged in the pressurized gas source in series with its output, thereby making it possible to, respectively, unblock and interrupt the flow path from the compressor to the pressurized gas pipe as the solenoid valve is opened and closed, which, respectively, causes a pressure increase or a pressure drop in the pressurized gas pipe that is connected to the output of pressurized gas source. In this case, the opening time of the switching valve defines the pulse duration of a pressure pulse. As an alternative, a branched pipe joint can be disposed at the output of the pressurized gas source, from which branched pipe joint the switching valve leads into the ambient environment. In this case, as the valve opens and closes, the flow path from the compressor to the pressurized gas pipe is, respectively, connected to or cut off from the ambient environment, thereby causing a pressure drop or a pressure increase in the pressurized gas pipe that is connected to the output of the pressurized gas source. In this case, the closing time of the switching valve defines the pulse duration of a pressure pulse.

The pulse repetition rate (pulse frequency) of the pressure pulses which are preferably periodically generated by the pressurized gas source is preferably in a range of 0.1 to 200 Hz and in particular in a range of 1 to 50 Hz. In addition to the pulse frequency, the pulse duration and/or the amplitude of the pressure pulses generated by the pressurized gas source can preferably be adjusted as well. For the purpose of setting a desired pulse frequency, pulse duration and pulse amplitude, the device preferably comprises a suitable input means with pushbutton switches or rotary control buttons, by means of which the desired parameters of the pressure pulses can be entered by an operator and set accordingly by the control unit. Provided especially for the purpose of setting the pulse frequency is a rotary control button which can preferably be steplessly adjusted between a minimum position and a maximum position in order to be able to (steplessly) set the pulse repetition rate (pulse frequency) of the pressure pulses between a minimum value and a maximum value. Using this rotary control button, an operator is able to select, for example, a desired foam consistency at the beginning of the foaming procedure and to set this consistency by means of the rotary control button. Once the setting has been made, however, it is still possible to change and, in particular, to readjust it during the foaming procedure, thereby producing a foam quality and consistency customized to the special requirements.

To maintain the desired temperature of the liquid during the foaming procedure, the device preferably comprises a temperature sensor for measuring the temperature of the liquid and the liquid foam produced. This temperature sensor is coupled to the control unit. In addition, a steam valve is disposed in the steam pipe, which steam valve is also coupled to and opened and closed by the control unit. As soon as the temperature sensor measures a product temperature (temperature of the liquid or of the liquid foam) specified by the operator, the steam valve in the steam pipe is closed and, at the same time, the pressure pulses are stopped from being introduced into the pump means. To this end, the switching valve optionally disposed in the pressurized gas source is closed and/or the compressor of the pressurized gas source is switched off.

To prevent steam or liquid from entering the pressurized gas source, a check valve is preferably disposed in the pressurized gas pipe and allows only pressurized gas to pass from the pressurized gas source into the pump means but prevents the flow of steam in the opposite direction.

Since the pressure of the gas delivered through the pressurized gas pipe into the pump means at a given compressor capacity is dependent on the flow resistance of the flow path leading from the compressor to the pump means, it is recommended that a throttle valve be disposed in the pressurized gas pipe so as to be able to set this flow resistance to a defined value. In the simplest case, a throttle valve with a fixed flow resistance can be used. A throttle valve with a variable flow resistance offers an additional degree of freedom for adjusting the pressure of the gas delivered into the pump means.

In addition, it is also possible to provide the pressure pulses with a pressure offset, i.e., with a continuous base pressure which is greater than the air pressure of the ambient environment. During the times (periods) in which the controllable switching valve of the pressurized gas source is closed, the pressurized gas source supplies a pressurized gas to the pressurized gas pipe, the pressure of which pressurized gas corresponds to the offset pressure. The pressure offset can be generated, for example, by configuring the switching valve in the form of a controllable throttle valve, with the switching valve not being completely closed during the times in which the pressurized gas source is delivering a pressurized gas with a predefined offset pressure, so that the pressurized gas generated by the compressor of the pressurized gas source is able to flow at a reduced pressure through the throttle valve and to thereby generate the pressure offset. When the switching valve is subsequently fully opened in the following cycle (or, in other words, in the following period of pressure pulses), the pressurized gas is able to flow at full pressure generated by the compressor through the switching valve and to thereby generate a pressure pulse which has a pressure amplitude higher than the offset pressure.

The pressure profile of the pressurized gas fed by the pressurized gas source into the pressurized gas pipe can be strictly periodic with a predefined frequency and period duration and, in particular, rectangular or sinusoidal. However, the pressure pulses can also be aperiodically generated and fed into the pressurized gas pipe.

BRIEF DESCRIPTION OF THE DRAWINGS

These and other features and advantages of the present invention follow from the embodiment examples described in greater detail below with reference to the appended drawings. The figures in the drawings show.

DETAILED DESCRIPTION

Figure 1:
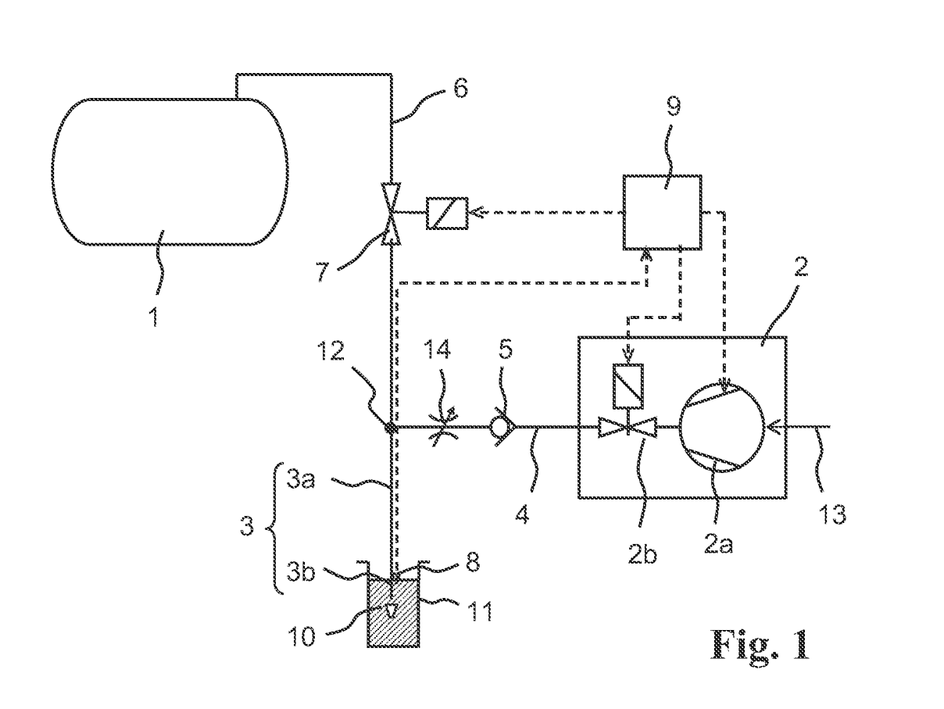
FIG. 1 a first embodiment of the invention comprising a unit for controlling the pressure delivered by the pressurized gas source by means of a switching valve.

As FIG. 1 indicates, a first embodiment of a device according to the present invention comprises a steam generator 1, a steam pipe 6 extending from the steam generator, a pressurized gas source 2, a pressurized gas pipe 4 extending from the pressurized gas source, a pump means 3 in the form of a pump pipe 3a and a nozzle 3b disposed on the end of the pump pipe for transporting a steam/gas mixture into a liquid 10 that is to be foamed. The liquid 10 which is contained in a receptacle 11 can be, in particular, a beverage, such as milk or a milk-containing beverage. To foam the liquid 10, the open end of the pump pipe 3a, on which the nozzle 3b is disposed, is immersed in the liquid 10. Via the steam pipe 6, steam generated in the steam generator 1 is fed to the pump means 3, and via the pressurized gas pipe 4, a gas that has been compressed in the pressurized gas source 2 is introduced into the pump means 3, thereby generating a steam/gas mixture in the pump means, which steam/gas mixture is fed via the pump pipe 3a into the liquid 10.

The steam pipe 6 and the pressurized gas pipe 4 are connected to each other at a branched pipe joint 12, from which the pump pipe 3a extends in the direction of the nozzle 3b. The pressurized gas source 2 comprises a compressor 2a and an electrically controllable switching valve in the form of a solenoid valve 2b disposed between the compressor 2a and the pressurized gas pipe 4 leading from the output of the pressurized gas source 2 to the branched pipe joint 12. Via a gas delivery pipe 13, gas is delivered at low pressure to the compressor 2a. The compressor 2a compresses the delivered gas and discharges it at increased pressure via the pressurized gas pipe 4. The gas is preferably air; however, other gases, such as carbon dioxide ($CO_2$) or nitrogen ($N_2$) or gas mixtures, may be involved as well. Preferably, the compressor 2a draws in air from the ambient environment via the gas delivery pipe 13.

In the pressurized gas pipe 4, a check valve 5 and a throttle valve 14 are disposed between the pressurized gas source 2 and the branched pipe joint 12. In the event of a pressure drop in the pressurized gas pipe 4, the check valve 5 prevents steam from the steam pipe 6 or liquid 10 from the receptacle 11 from entering the pressurized gas source 2. The throttle valve 14 which is preferably disposed between the check valve 5 and the branched pipe joint 12 ensures that in the section of the pressurized gas pipe 4 between the compressor 2a and the throttle valve 14, a defined pressure is built up by the compressor 2a. In the simplest case, the throttle valve 14 can have a fixed flow resistance. However, the valve can also be configured in the form of a controllable valve so that its flow resistance can be set to a desired value and, if needed, can be changed.

Disposed in the steam pipe 6 between the steam generator 1 and the branched pipe joint 12 is an electrically controllable steam valve 7, which can also be configured in the form of a solenoid valve. The steam valve 7, the solenoid valve 2b and the compressor 2a are controlled by an electronic control unit 9, to which they are connected via associated control lines. The control unit 9 contains a human-machine interface in the form of keys, rotary buttons and a display, which can also be a touchscreen, for communicating with a user. Via the interface, the user can enter control commands and read displayed operating states and error messages.

Attached to the open end of the pump means 3, which is immersed in the liquid and which is preferably disposed on the nozzle 3b, is a temperature sensor 8, which measures the temperature of the liquid 10 and transmits it via a measuring lead to the control unit 9. Not shown in FIG. 1 are an additional control line leading from the control unit 9 to the steam generator 1, which is also controlled by the control unit, and a control line which, in the event that a controllable throttle valve 14 is used, leads from the control unit 9 to the throttle valve 14.

To operate the device according to the present invention once the steam generator 1 is running, the steam valve 7 is opened by the control unit 9, and, at the same time, the pressurized gas source 2 is activated. The steam generated by the steam generator 1 passes through the steam pipe 6 to the branched pipe joint 12. At this branched pipe joint, the steam is mixed with the pressurized air, which, exiting from the compressor 2a, flows through the solenoid valve 2b, which is controlled by the control unit 9, and through the pressurized gas pipe 4 and passes through the check valve 5 and the throttle valve 14 to also reach the branched pipe joint 12. From there, the steam/air mixture subsequently flows through the pump pipe 3*a* to the nozzle 3*b* where it enters and foams the liquid 10.

Figure 5A:
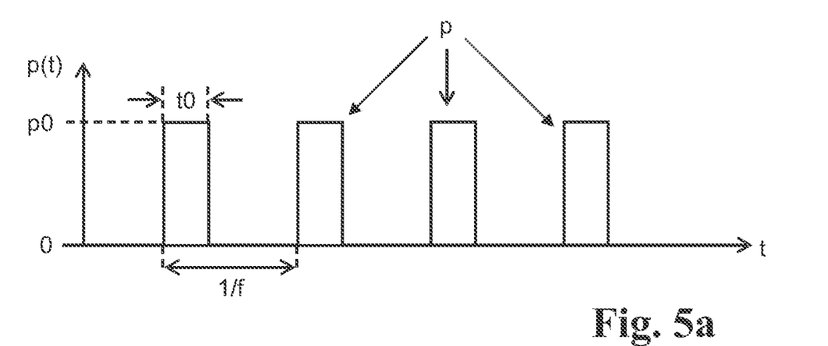
FIGS. 5a and 5b the time profile of the pressure delivered by the pressurized gas source in a first mode of operation (FIG. 5a) and a second mode of operation (FIG. 5b).

Beginning at the point in time at which the steam valve 7 is opened, the solenoid valve 2*b* is actuated by the control unit 9 in such a manner that it periodically opens and closes continuously, so that the pressure in the pressurized gas pipe 4 varies and alternates over time, as is schematically indicated in FIG. 5*a*. At the same time, a sequence of individual pressure pulses p, which have a predefined amplitude p0, pulse duration t0, frequency f and period duration 1/f, are generated. The amplitude p0 is predefined by the pressure generated by the compressor 2*a* and by the action of the throttle valve 14. To set a desired amplitude p0, the compressor 2*a* is actuated by the control unit 9 according to the input by the user. An additional degree of freedom with respect to setting the amplitude p0 is offered if the throttle valve 14 can be controlled. Between two successive pressure pulses, the pressure in the mode of operation shown in the diagram of FIG. 5*a* is zero, i.e., the pressurized gas source 2 does not deliver any pressurized gas since the switching valve 2*b* is completely closed.

Figure 5B:
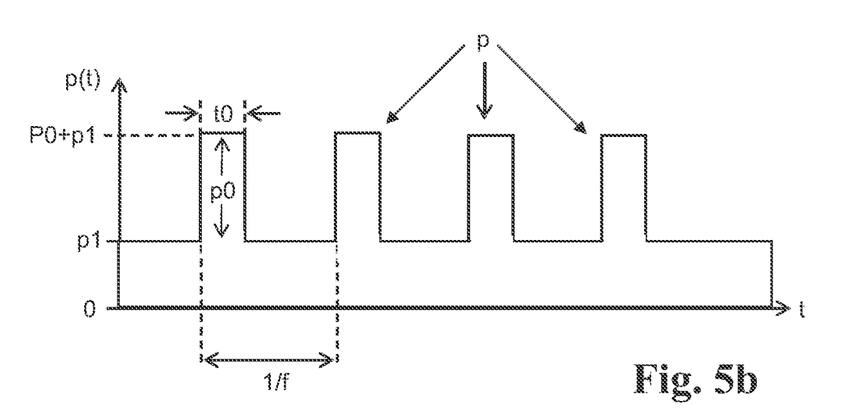

In a mode of operation that differs from the mode of operation shown in FIG. 5*a* and which is schematically represented in the diagram of FIG. 5*b* by the pressure profile of the pressure pulses, a pressure offset p1 is provided, which is continuously present on the pressurized gas pipe 4, i.e., the pressurized gas source 2 continuously generates a pressurized gas with a predefined pressure amplitude equal to the pressure offset p1. To this pressure offset p1, the preferably periodically generated pressure pulses are applied with pulse amplitude p0, as schematically shown in FIG. 5*b*. While the pressure pulses are being generated, the pressurized gas source generates a pressure pulse of the compressed gas with an overall pressure amplitude of p0+p1. The pressure offset p1 can be generated, for example, in that the switching valve 2*b* is not completely closed, but is slightly open even between two successive pressure pulses, so that the pressurized gas generated by the compressor 2*a* can flow (at reduced pressured) into the pressurized gas pipe 4. In this mode of operation, the switching valve 2*a* operates as a throttle valve or, in other words, as a pressure-compensated flow control valve. The pressure amplitude of the pressure offset p1 is here determined by the open position of the switching valve 2*b*.

As an alternative, the pressure offset p1 can also be generated by a bypass in the pressurized gas pipe 4, which circumvents the switching valve 2*b* and includes a preferably controllable throttle valve, by means of which the flow cross section in the bypass is reduced and can preferably be adjusted.

The control unit 9 sets the pulse duration t0 and the pulse frequency f independently of each other according to the user input by actuating the solenoid valve 2*b*, thereby ensuring that the duty cycle, i.e., the ratio of pulse duration t0 to period duration 1/f, can be varied as well. Thus, four parameters are available overall, i.e., the frequency f, the amplitude p0, the pulse duration t0 and the pressure offset p1, all of which can be varied independently of each other so as to optimize the result of the foaming procedure, thereby offering the user the possibility, even while the device is in operation, to preferably change these parameters in response to the ongoing foaming process. The pressure profile p(t) of the pressure pulses shown in FIGS. 5*a* and 5*b* is a schematic and idealized representation insofar as the actual upward and downward slopes of a pressure pulse p are limited and a pressure pulse p therefore cannot be strictly rectangular.

The signal measured by the temperature sensor 8 serves as a sign that the foaming procedure has been completed. Steam supplied to the liquid 10 heats the liquid. Therefore, once a predefined temperature threshold has been reached, the foaming procedure stops. This is especially useful when the liquid 10 used is milk, since the generation of foam stops at a specific temperature due to the coagulation of the milk proteins. In this case, the control unit 9 simultaneously closes both the solenoid valve 2*b* and the steam valve 7 as soon as the temperature sensor 8 has reached the predefined temperature threshold.

Figure 2:
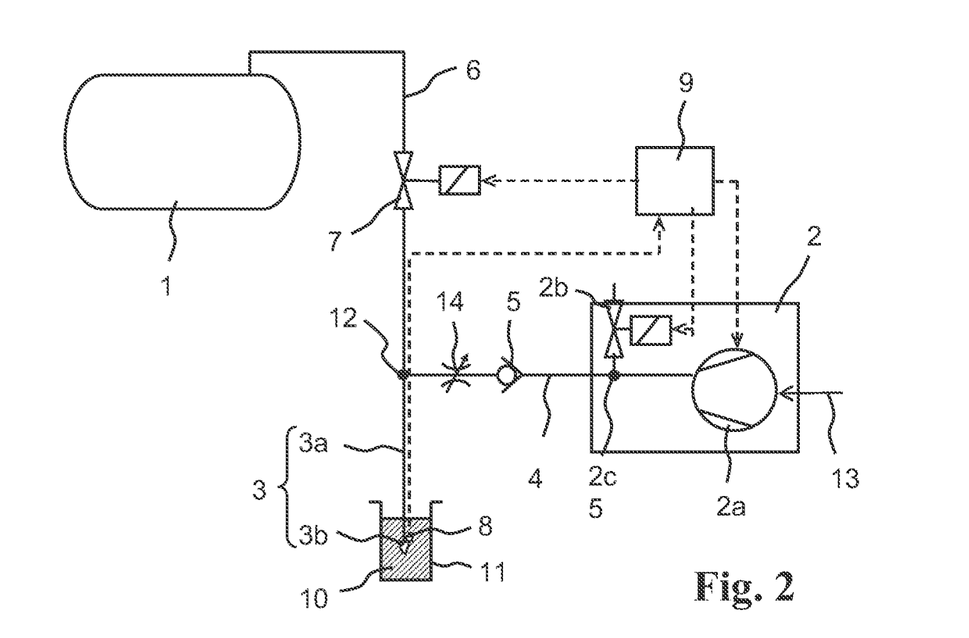
FIG. 2 a second embodiment of the invention comprising a unit for controlling the pressure delivered by the pressurized gas source by means of a switching valve.

A second embodiment of the present invention, which is illustrated in FIG. 2, differs from the first embodiment, which is shown in FIG. 1, in that the switching valve (solenoid valve 2*b*) is not connected in series with the output of the pressurized gas source 2 between the compressor 2*a* and the pressurized gas pipe 4, but that instead a branched pipe joint 2*c* is disposed at the output of the pressurized gas source 2 between the compressor 2*a* and the pressurized gas pipe 4, which branched pipe joint is coupled to a port of the switching valve (solenoid valve 2*b*). The other port of the switching valve (solenoid valve 2*b*) leads to the ambient environment. In all other respects, the configuration of the device does not differ from that of the first embodiment, so that the elements of the device shown in FIG. 2 are designated with the same reference numerals as those in FIG. 1.

While closing the switching valve (solenoid valve 2*b*) in the first embodiment shown in FIG. 1 leads to a pressure drop in the pressurized gas pipe 4, which means that the switching valve (solenoid valve 2*b*) is open during a pressure pulse p and closed in the interval between two pressure pulses p, the exact reverse applies in the second embodiment since, because of the open switching valve (solenoid valve 2*b*), the branched pipe joint 2*c* is directly connected to the ambient environment, which leads to a drop in pressure in the pressurized gas pipe 4. Thus, in the second embodiment, the control unit 9 must actuate the switching valve (solenoid valve 2*b*) in the reverse order.

Figure 3:
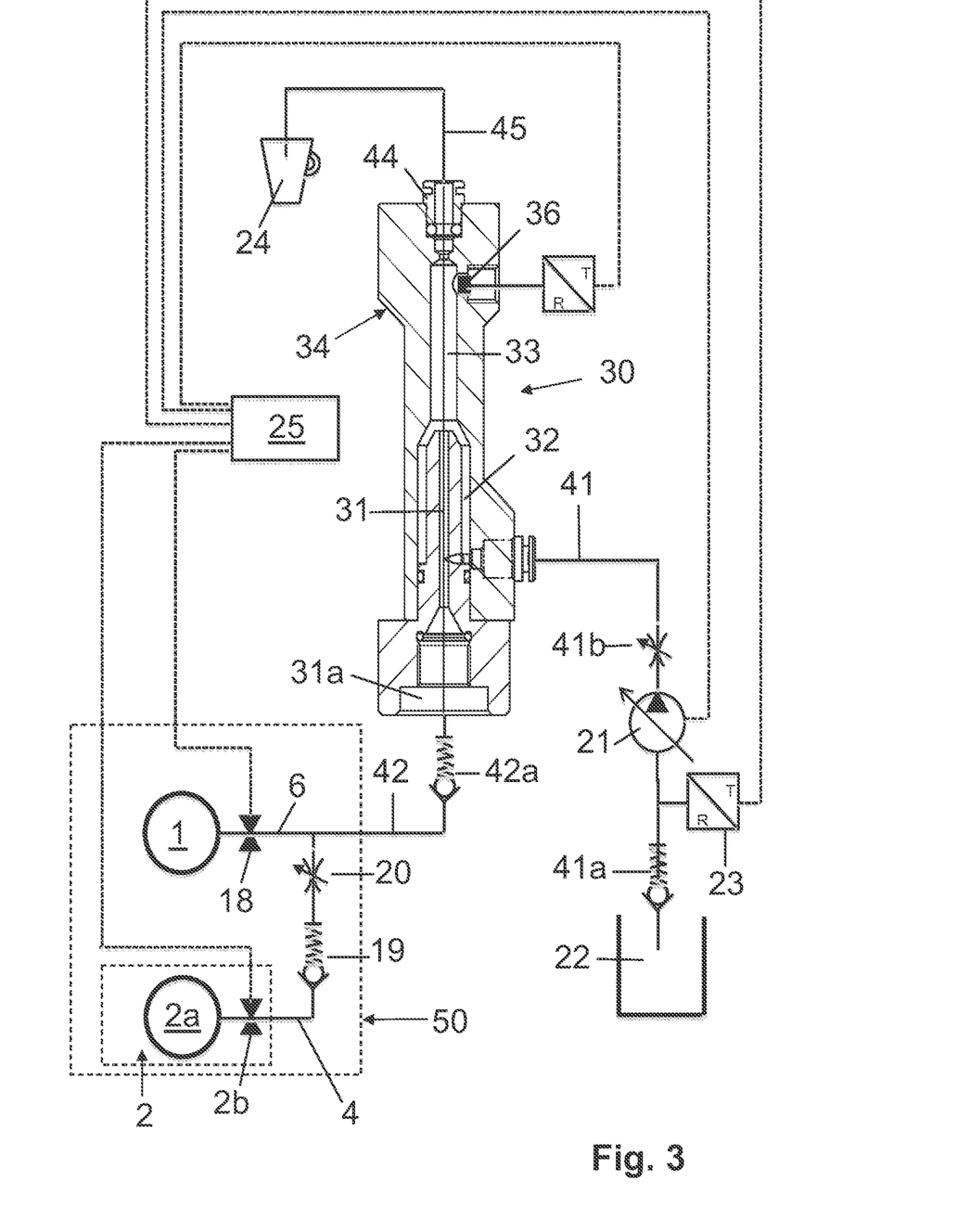
FIG. 3 a third embodiment of the invention comprising a heating unit for generating a steam/gas mixture.

FIG. 3 shows a third embodiment of the present invention in which the pump means for transporting the steam/gas mixture into the liquid is a heating unit 30 in which a steam/gas mixture, in particular a steam/air mixture, is generated and supplied to the liquid to be heated and foamed in order to introduce the steam/gas mixture in the heating unit 30 into the liquid.

Figures 4A, 4B:
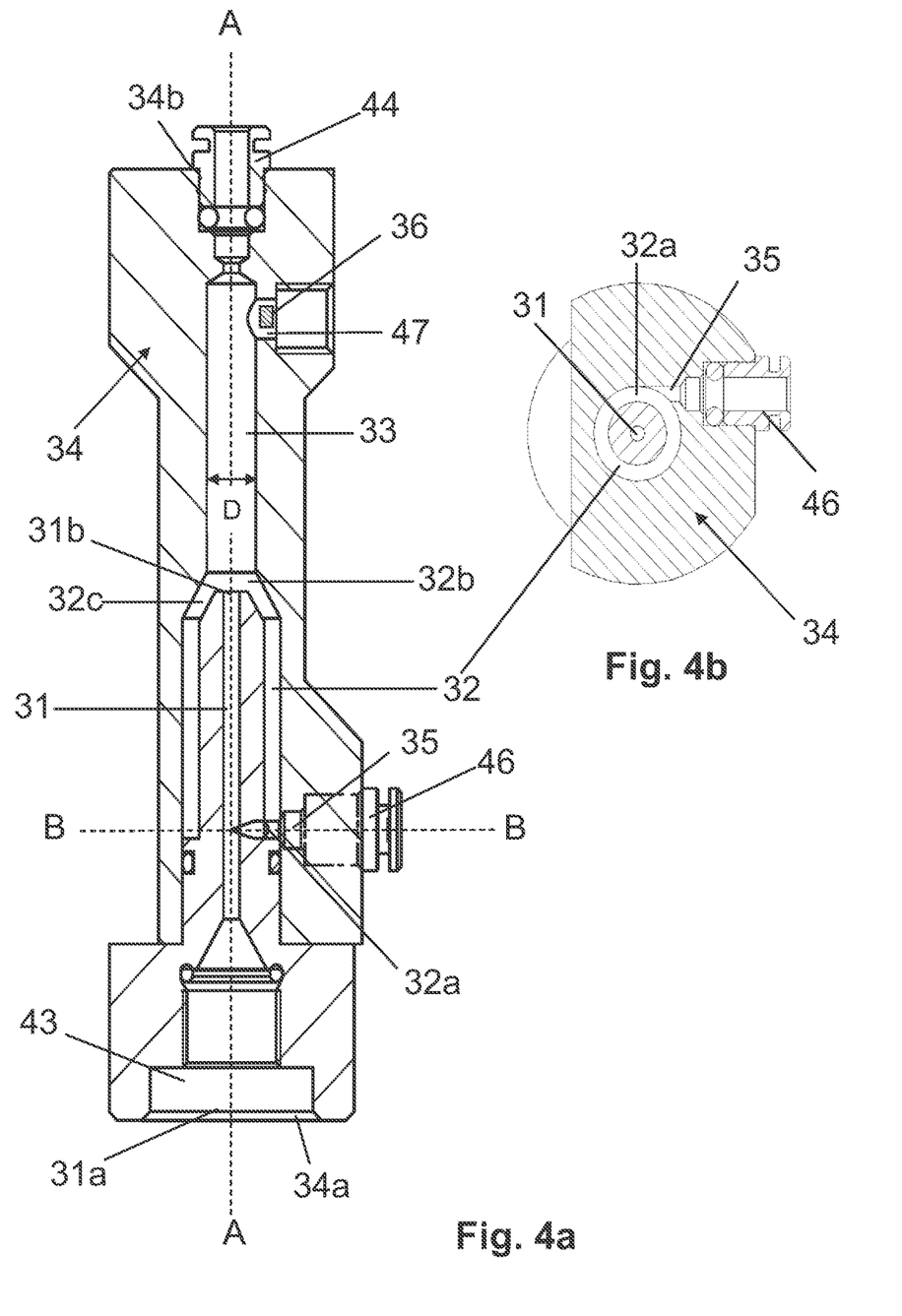
FIGS. 4a and 4b a detailed representation of the heating unit of the device shown in FIG. 3 in a longitudinal section (FIG. 4a) and a cross section through plane B-B (FIG. 4b)

The heating unit 30 shown in a detailed representation in FIGS. 4*a* and 4*b* comprises a reactor block 34 made of plastic, in particular PEEK, PSU or PEI, which has an essentially cylindrical shape with a longitudinal center axis A. In the reactor block 34, an inner steam channel 31, an outer annular channel 32, which coaxially surrounds the inner steam channel along its entire length, and a drain channel 33, which is coaxially disposed relative to the steam channel 31, are formed. The steam channel 31 has an upstream end 31*a*, which is formed by a front face opening 34*a* in the reactor block 34. In addition, the inner steam channel 31 also has a downstream end 31*b*, which opens out in the drain channel 33 coaxially extending from the steam channel 31 in the downstream direction. The drain channel 33 ends in a front face opening 34*b* in the reactor block 34. The diameter of the drain channel 33 is larger than the diameter of the steam channel 31, for example, twice as large.

Disposed in the area of the upstream end 31a of the steam channel 31 is a connecting port 43. Via this connecting port 43, the inner steam channel 31 can be connected to a steam delivery pipe 6 (not shown in FIGS. 4a and 4b) for supplying in a steam/air mixture. On the downstream end of the drain channel 33, an additional connecting port 44 for connecting a drain pipe 45 is disposed.

The outer annular channel 32, which coaxially surrounds the inner steam channel 31, also has an upstream end 32a and a downstream end 32b. At the upstream end 32a, the outer annular channel 32 is connected to a radial bore 35 in the reactor block 34 (as shown in FIG. 4b). As FIG. 4b indicates, the radial bore 35 on the upstream end 32a thereof opens tangentially out into the annular channel 32. In the radial bore 35, an additional connecting port 46 is disposed. Via this connecting port 46, the radial bore 35 can be connected to a delivery pipe (not shown in FIGS. 4a and 4b) for a liquid that is to be heated and foamed. Via this delivery pipe, (cold) milk, for example, can be introduced into the radial bore 35 and from there into the outer annular channel 32, which milk is to be heated and foamed in the heating unit 30. Hereinafter it will be assumed that the liquid to be heated and foamed is milk.

As indicated in FIGS. 4a and 4b, in the area of the downstream end 32b, the outer annular channel 32 has a conical section 32c. In this conical section 32c, the outside diameter of the annular channel 32 is conically reduced to the diameter D of the drain channel 33, while the diameter of the channel remains the same. At the downstream end 32b of the outer annular channel 32, at which the conical section 32c has an outside diameter corresponding to the diameter D of the drain channel 33, the annular channel 32 opens out into the drain channel 33. In the area in which both the inner steam channel 31 and the outer annular channel 32 open out into the drain channel 33, the steam/air mixture delivered through the steam channel 31 is mixed with the milk delivered through the outer annular channel 32. By mixing the hot steam/air mixture with the milk, the milk is heated and foamed to generate a milk foam.

To measure the temperature of the heated or foamed milk, a temperature sensor 36 is preferably disposed in the downstream area of the drain channel 33. The temperature sensor 36 is disposed in a radial bore 47 which opens out into the drain channel 33.

In the device shown in FIG. 3 which comprises the heating unit 30 described above, the upstream end 31a of the steam channel 31 of the heating unit 30 is connected to a delivery pipe 42. The delivery pipe 42, in which a check valve 42a is preferably disposed, connects the heating unit 30 to a system 50 for generating a steam/air mixture. The system 50 for generating the steam/air mixture comprises a steam generator 1 and a pressurized gas source 2 with a compressor 2a and a switching valve 2b. The steam generator 1 is connected via a steam pipe 6 to the delivery pipe 42, and the pressurized gas source 2 is connected via a pressurized gas pipe 4 to the delivery pipe 42. The pressurized gas source 2 comprises a preferably electrically controllable switching valve 2b (for example, a solenoid valve) which is disposed in the pressurized gas pipe 4. In addition, also disposed in the pressurized gas pipe 4 are a check valve 19 and a controllable throttle valve 20. An electrically controllable switching valve (for example, a solenoid valve) 18 is also disposed in the steam pipe 6.

In the device shown in FIG. 3, the upstream end 32a of the annular channel 32 of the heating unit 30 is connected to a milk pipe 41. A free end of the milk pipe 41 is configured in the form of a dip tube and immersed in a receptacle 22 containing cold milk. Disposed in the milk pipe 41 are a check valve 41a, a pump 21 and a controllable throttle valve 41b. Using the pump 21, cold milk can be drawn from the receptacle 22 via the dip tube into the milk pipe 41 and from there transported into the annular channel 32 of the heating unit 30. To measure the temperature of the drawn-in milk, a temperature sensor 23 is preferably disposed in the milk pipe 41.

Connected to the downstream end of the drain channel 33 of the heating unit 30 is a drain pipe 45. A free end of the drain pipe 45 opens out into a receptacle 24. The foam product produced in the heating unit 30, which in the embodiment example of FIG. 3 is milk foam, is transported via the drain pipe 45 into the receptacle 24.

To control the device shown in FIG. 3, a control unit 25 is provided. The control unit 25 is coupled to the temperature sensors 36 and 23, which measure the temperature of the cold milk and the foam product generated (heated milk foam). In addition, the control unit 25 for controlling the valves 18 and 2b is disposed, respectively, in the steam pipe 6 and in the pressurized gas pipe 4 so as to open and close these switching valves. The control unit 25 also serves to control the pump 21 in the milk pipe 41.

In the embodiment example of the device shown in FIG. 3, the pressurized gas source 2 sends pressure pulses of compressed gas via the pressurized gas pipe 4 into the heating unit 30, which pressure pulses are generated by the switching valve 2b. To this end, the pressurized gas source 2 comprises the compressor 19 which compresses a gas, in particular air, to produce a pressurized gas (pressurized air) and feeds it into the pressurized gas pipe 4. As in the embodiment examples of the invention shown in FIGS. 1 and 2, the pressurized gas source 2 is configured in such a manner that the switching valve 2a is alternatingly (preferably periodically with a predefinable frequency) opened and closed, thereby generating pressure pulses of the compressed gas, which pulses can be introduced via the pressurized gas pipe 4 into the delivery pipe 12. The switching valve 2b of the pressurized gas source 2 can preferably be actuated by the control unit 25 by pulse width modulation.

The pressure pulses of the pressurized gas source 2 are preferably periodically introduced with an adjustable frequency into the delivery pipe 42 via the pressurized gas pipe 4 and through the controllable throttle valve 20. In the delivery pipe 42, the pulses of the pressurized gas (in particular pressurized air) are mixed with the hot steam introduced from the steam source 1 via the steam pipe 6 into the delivery pipe 12 and generate a pulsed steam/air mixture in the delivery pipe 12. The pulsed steam/air mixture is fed via the delivery pipe 12 into the inner steam channel 31 of the heating unit 30 and from there flows into the drain channel 33. In the drain channel 33, the pulses of the steam/air mixture are mixed with the cold milk fed via the outer annular channel 32 into the heating unit 30, thereby heating the milk and foaming it to produce a milk foam. The thus produced foam product (milk foam) is transported via the drain channel 33 into the drain pipe 45 and from there into the receptacle 24.

By setting the parameters of the pressure pulses generated by the pressurized gas source 2, such as the frequency f and amplitude p0 of said pulses, it is possible to influence and customize the composition of the milk foam generated in the heating unit 30. To be able to set the frequency f and the amplitude p0 of the pressure pulses to the desired values, the control unit 25 comprises setting means, for example, a rotary control button or pushbuttons, by means of which the frequency and/or the amplitude of the pressure pulses can preferably be steplessly adjusted between a minimum value and a maximum value. The amplitude of the pressure pulses can be controlled via the position of the controllable throttle valve 20. The period or frequency f of the pressure pulses can be adjusted by actuating the switching valve 2*b*.

The present invention is not limited to the embodiment examples illustrated in the drawings. Thus, for example, as an alternative to ambient air, another gas, for example, an inert gas, such as nitrogen, can be used if the oxidizing effect of the oxygen content of air would interfere with the generation of foam or with the properties of the finished foam. Depending on the type of liquid to be foamed, the gas used may also be carbon dioxide. In this case, a compressor 2*a* is not needed since technical gases can be stored under high pressure in pressure tanks. Instead of a compressor, a pressure reducer for reducing the pressure of the gas from the value prevailing in the storage tank to the value required in the pressurized gas pipe 4, i.e., to the desired amplitude p0 of the pressure pulses p will have to be used. Thus, to generate pressure pulses p, a controllable solenoid valve 2*b*, such as described in the first and third embodiment shown in FIGS. 1 and 3, must be provided in order to generate the pressure pulses.

Furthermore, the pressure profile of the pressure pulses can be different from that shown in FIGS. 5*a* and 5*b*. Thus, it is possible, for example, not to generate the pressure pulses p periodically with a fixedly predefined frequency f, but instead to generate them aperiodically. In addition, it is possible to select a different pulse duration t0 and a different time interval between the successive pressure pulses p. Furthermore, the profile of the amplitude p0 does not have to be constant as shown in FIGS. 5*a* and 5*b*, but can be changed during a foaming procedure, for example, by using a throttle valve 14 with a controllable flow resistance.

The invention claimed is:

1. A device for heating and foaming of a beverage liquid, comprising:
   a steam generator;
   a pressurized gas source producing a pressurized gas;
   a gas conduit supplying the pressurized gas;
   a controllable switching valve in gas flowing communication with the gas conduit and operative to periodically change the pressure within the gas conduit by opening and closing the valve over time using pulse width modulation while continuously maintaining a minimum pressure;
   a pump connected to the steam generator;
   an output conduit connected to the output of the pump and connected to the gas conduit for transporting the steam and gas to the beverage liquid with a temporal pressure pattern corresponding to the pulse width modulation in the gas conduit; and
   a control unit controlling the opening and closing of the switching valve for generating pressure pulses with a temporal pressure profile having a pressure offset, so that in times between the pressure pulses pressurized gas is fed into the gas conduit having the minimum pressure.

2. The device of claim 1, wherein the pressurized gas source includes a compressor.

3. The device of claim 2, wherein the switching valve is one of (a) connected at an input to the output of the pressurized gas source and connected at an output to the output conduit and (b) connected at an input to the gas conduit and connected at an output vented to atmosphere.

4. The device of claim 1, wherein the controllable switching valve generates the temporal pressure pattern with an adjustable pulse frequency.

5. The device of claim 4, wherein the pulse frequency is in the range of 0.1 to 200 Hz.

6. The device of claim 4, wherein the pulse frequency is in the range of 1 to 50 Hz.

7. The device of claim 1, wherein the control unit is programmable, and wherein at least one of the pulse frequency, the pulse duration, and the amplitude of the temporal pressure pattern generated within the pressurized gas source by the controllable switching valve can be adjusted using the programmable control unit.

8. The device of claim 1, wherein a flow control device controls flow within the gas conduit, the flow control device selected from a check valve, a throttle valve with a fixed flow resistance, and a throttle valve with an adjustable flow resistance.

9. The device of claim 1, wherein a flow control device controls flow within the output conduit, the flow control device selected from a check valve, a throttle valve with a fixed flow resistance, and a throttle valve with an adjustable flow resistance.

10. The device of claim 1, wherein the control unit is coupled to at least one of the steam generator, the steam valve, and the switching valve.

11. The device of claim 1, wherein the pump includes a heating unit comprising an inner steam channel and an outer annular channel for the liquid to be foamed, the outer annular channel coaxially surrounding the inner steam channel, with a mixture of steam and the pulses of pressurized gas being delivered at an upstream end of the steam channel and with the liquid being fed in at an upstream end of the annular channel and with a downstream end of both the steam channel and the annular channel opening out into a drain channel for discharging the heated and foamed liquid.

12. The device of claim 11, wherein the steam channel, the annular channel and the drain channel are formed in a reactor block, with the steam channel in the reactor block extending in an axial direction, with the upstream end of the steam channel being connected to the delivery pipe, through which the mixture of steam and pressure pulses of the pressurized gas is vertically introduced against the force of gravity into the steam channel to flow from the bottom to the top and towards the downstream end of the steam channel.

13. The device as in claim 12, wherein the reactor block has a substantially cylindrical shape with a longitudinal center axis, wherein the steam channel and the drain channel extend along the longitudinal center axis of the reactor block, and wherein the annular channel is disposed coaxially relative to the longitudinal center axis of the reactor block and coaxially surrounds the steam channel along its entire length.

14. The device of claim 12, wherein the upstream end of the annular channel is connected to a radial bore which extends transversely or obliquely relative to the longitudinal axis of the annular channel in the reactor block, with the radial bore being connected to the liquid pipe, wherein the radial bore opens out tangentially into the annular channel.

15. The device of claim 1, wherein the switching valve includes a solenoid.

16. The device of claim 1, wherein the control unit includes a programmable controller which controls a valve of the controllable switching valve to operate using a predetermined pulse width modulation.

17. The device of claim 1, wherein pressurized gas source includes a mechanical compressor.

18. The device of claim 1, wherein the device further includes a bypass conduit in the gas conduit which bypasses the controllable switching valve, the minimum pressure being maintained by bypassing a portion of the pressurized gas through the bypass conduit.

19. The device of claim 1, the minimum pressure being maintained by not completely closing the controllable switching valve.

\* \* \* \* \*